United States Patent [19]
Lipo et al.

[11] Patent Number: 5,870,292
[45] Date of Patent: Feb. 9, 1999

[54] SERIES RESONANT CONVERTER FOR SWITCHED RELUCTANCE MOTOR DRIVE

[75] Inventors: Thomas A. Lipo, Middleton, Wis.; Sun-Soon Park, Kyungki-Do, Rep. of Korea

[73] Assignee: Electric Power Research Institute, Inc., Palo Alto, Calif.

[21] Appl. No.: 719,846

[22] Filed: Sep. 30, 1996

[51] Int. Cl.$^6$ .................................................. H02M 5/45
[52] U.S. Cl. ............................ 363/37; 363/135; 318/701
[58] Field of Search ................................. 363/35, 37, 16, 363/27, 65, 28, 137, 135; 318/803, 701; 323/235

[56] References Cited

U.S. PATENT DOCUMENTS

| | | | |
|---|---|---|---|
| 2,730,667 | 1/1956 | Uhlmann | 321/2 |
| 4,019,105 | 4/1977 | Cornell et al. | 318/227 |
| 4,112,339 | 9/1978 | Lipo | 318/227 |
| 4,525,774 | 6/1985 | Kino et al. | 363/17 |
| 4,730,242 | 3/1988 | Divan | 363/37 |
| 4,833,584 | 5/1989 | Divan | 363/37 |
| 4,864,483 | 9/1989 | Divan | 363/37 |
| 4,942,511 | 7/1990 | Lipo et al. | 363/136 |
| 4,965,709 | 10/1990 | Ngo | 363/37 |
| 5,038,267 | 8/1991 | De Doncker et al. | 363/89 |

OTHER PUBLICATIONS

G.R. Dunlop, "Power Device Reduction Using Negative Torque Sequences in Switched Reluctance Motors", ICEM '88 Conf., Italy, Sep. 1988, pp. 595–598.

L.Y. Xu and T.A. Lipo, "Analysis of a Variable Speed Singly–Salient Reluctance Motor Utilizing Only Two Transistor Switches", in Conf., Rec. IEEE IAS Annual Meeting, Oct. 1988, pp. 38–43.

D.A. Philips, "Switched Reluctance Drives: New Aspects", in Conf. Rec., IEEE PESC Jun. 1989, pp. 579–584.

H. Le–Huy, P. Viarouge and B. Francoeur, "A Novel Unipolar Converter for Switched Reluctance Motor", in Conf. Rec., IEEE PESC, Jun. 1989, pp. 3–10.

*Primary Examiner*—Shawn Riley
*Attorney, Agent, or Firm*—Leonard Bloom

[57] ABSTRACT

A resonant DC link converter which is specifically adapted for driving a switched reluctance motor (SRM) using low power (VA) rated switches, includes an input circuit providing a DC supply voltage, a resonating inductance (connected to the switched input circuit) for generating a resonating DC link current, and an output converter circuit synthesizing a multi-phase AC output signal to power a respective phase winding of the SRM. A controller switches the switch devices of the input circuit and output converter circuits in a predetermined sequence.

10 Claims, 8 Drawing Sheets

SERIES RESONANT CONVERTER FOR SWITCHED RELUCTANCE MOTOR DRIVE

BACKGROUND OF THE INVENTION

The present invention relates to series-resonant power converters and, more particularly, to a series-resonant converter topology and method of commutation for driving a switched reluctance motor (SRM).

The switched reluctance motor (SRM) has become an attractive alternative to conventional AC and DC motors in many industrial applications. This trend is a result of several distinct advantages in SRMs. For instance, the SRM is simple in design and lends itself to low cost construction. In operation, the SRM demonstrates an absence of shoot-through faults and has a high torque/inertia ratio.

Notwithstanding the above-described advantages of SRMs, the cost and performance of an SRM system is highly dependent on the selected power converter topology and commutation method used in powering the motor. The power converter for an SRM drive should be designed with the following objectives:

1. accurate yet high-speed switched power control for good drive performance, high efficiency and reliability;
2. lower power (VA) rating for lower cost components; and
3. minimum number of switches.

Soft-switching (a.k.a. resonant) power converters excel in each category, and they are fast becoming the favored alternative for static power conversion. The active devices in soft-switching converters are switched at zero-voltage or zero-current intervals. This way, they incur far lower switching losses than their hard-switched counterparts.

For example, U.S. Pat. No. 4,730,242 to Divan discloses a parallel resonant link converter in which the active switching devices are switched at times of zero-voltage intervals. Since the switching losses are comparatively small, commutation may occur at higher frequencies. However, the link current is bi-directional. Consequently, costly bi-polar self-commutated switching devices are required.

Series-resonant current source converters were developed in answer to the problem. With series-resonant converters, the switching of the active devices occurs at times of zero-current intervals rather than zero-voltage. For example, U.S. Pat. No. 4,942,511 to Lipo et al disclose a series resonant DC link converter. The natural turn-off ability of the switching devices is used for commutation. Hence, the converter can be implemented using less expensive uni-directional self-commutated switching devices such as thyristors.

It would be greatly advantageous if the series-resonant DC static power conversion circuits could be adapted for driving an SRM.

BRIEF SUMMARY OF THE INVENTION

It is, therefore, an object of the present invention to provide a low cost resonant DC link converter for use in driving a switched reluctance motor (SRM).

It is another object to provide a fast and accurate switched power converter for improved SRM drive performance, high efficiency and reliability.

It is a further object to provide a power converter as described above which is capable of driving an SRM using a minimal number of low power (VA) rated switches.

It is still another object to provide a method and apparatus for efficiently switching the above-described converter in accordance with the inductance profile of an SRM.

In accordance with the above-described objects, the present invention provides a resonant DC link current source converter. In general terms, the converter of the present invention comprises a switched input circuit for connection to an input power source (which is a DC or AC voltage source) for providing a DC supply voltage of selectable polarity.

The switched input circuit may take the form of a DC-to-DC switched bridge-type converter having a first diode with an anode connected to the cathode of a first switch device, a second diode having an anode connected to the anode of the first switch device, and a second switch device having the anode connected to the cathode of the second diode and the cathode connected to the cathode of the first diode.

Alternatively, the switched input circuit may be an AC-to-DC having 2N gated switch devices arranged in N parallely-connected switch legs, with each switch leg having an upper switch device connected in series to a lower switch device. The interim connection between the switch devices of each leg is intended for connection to a corresponding phase of an input power supply.

The resonant DC link current source converter of the present invention also includes a resonating inductance connected to the switched input circuit for generating a resonating DC link current from the input power supply voltage.

In addition, a switched output converter circuit is connected to the resonating inductance for synthesizing a multi-phase AC output signal from the resonating DC link current. The switched output converter circuit further includes a plurality of parallely-connected switch legs each corresponding to a phase of the switched reluctance motor. The switch legs are each a resonating capacitance connected in series with a switch device and in parallel with a phase winding of the switched reluctance motor.

The invention also provides a method and apparatus for generating the appropriate gating signals for the above-described power converter in order to efficiently commutate a conventional switched reluctance motor (SRM).

These and other objects of the present invention will become apparent from a reading of the following specification taken in conjunction with the enclosed drawings.

BRIEF DESCRIPTION OF THE DRAWINGS

FIGS. 4(a–f), respectively, are graphical representations of:

(a) the inductance $L_m$ profile of a typical SRM;

(b) the corresponding ideal current drive profile;

(c) the voltage $V_{cr1}$ profile appearing across capacitance $C_{r1}$;

(d) the voltage $V_{cr2}$ across capacitance $C_{r2}$;

(e) the resultant resonating link current $i_{dr}$; and (f) representative phase currents $i_A$ and $i_S$ for an incoming and outgoing phase which show the delay and overlap due to the inductance of the outgoing phase.

Figure 1:
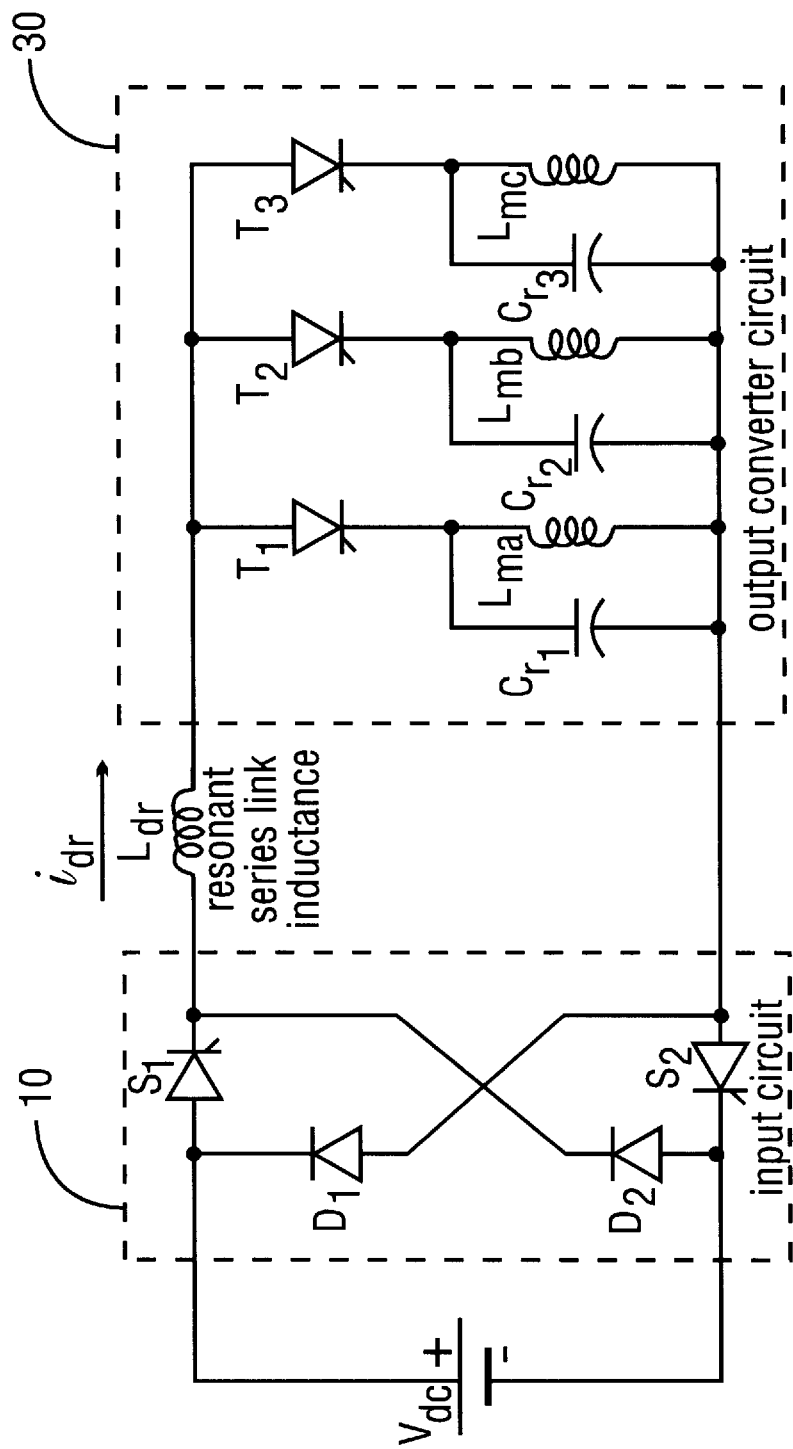
FIG. 1 is a schematic diagram of a series-resonant zero-current SRM power converter circuit according to a single phase DC-to-AC embodiment of the present invention.
Figure 4:
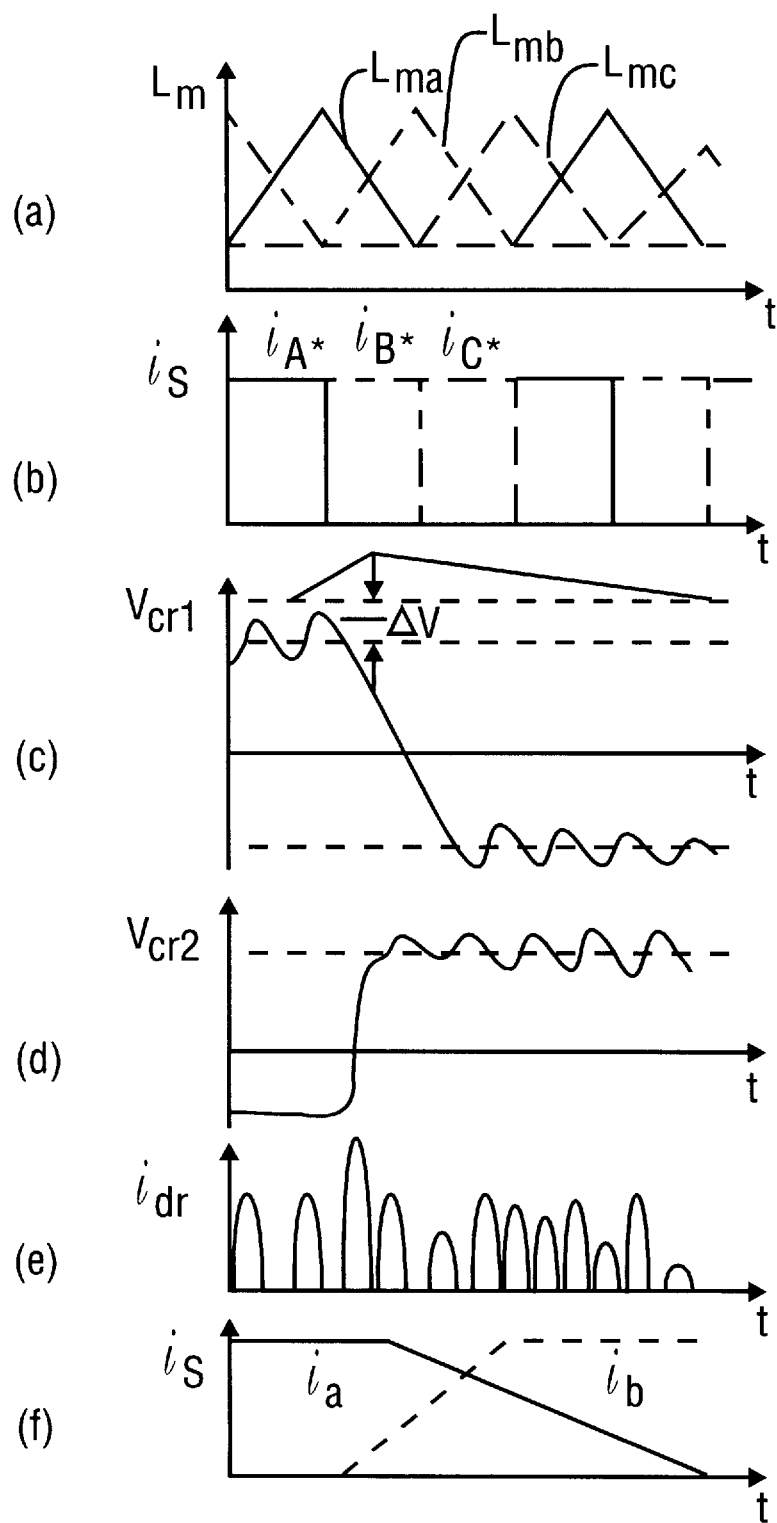
Figure 5:
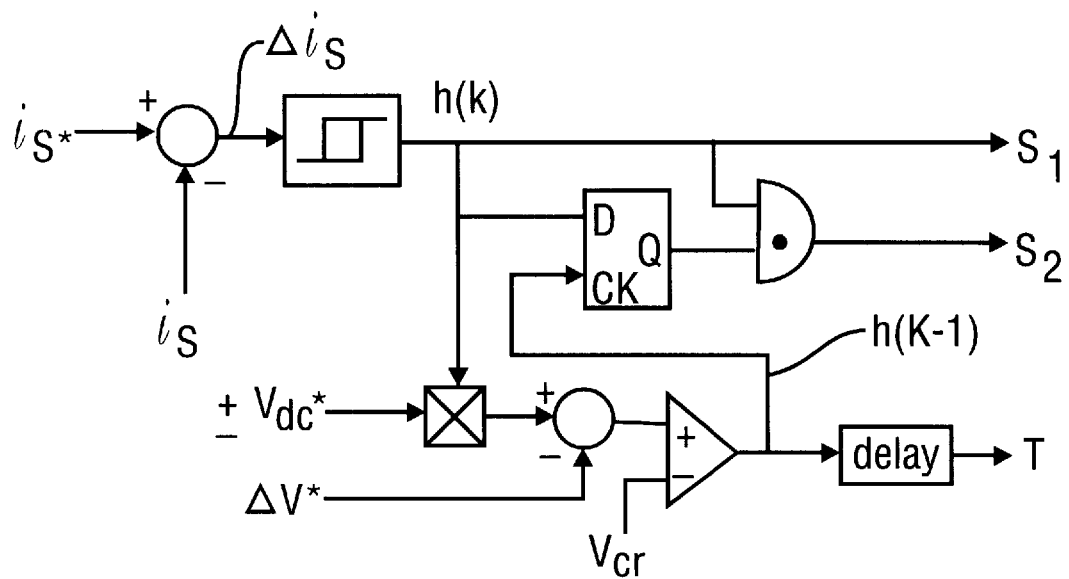

FIG. 5 is a block diagram of a current controller according to the present invention which is suitable for switching the power converter of FIG. 1 in order to achieve the phase current transition as in FIG. 4(f).

Figure 6:
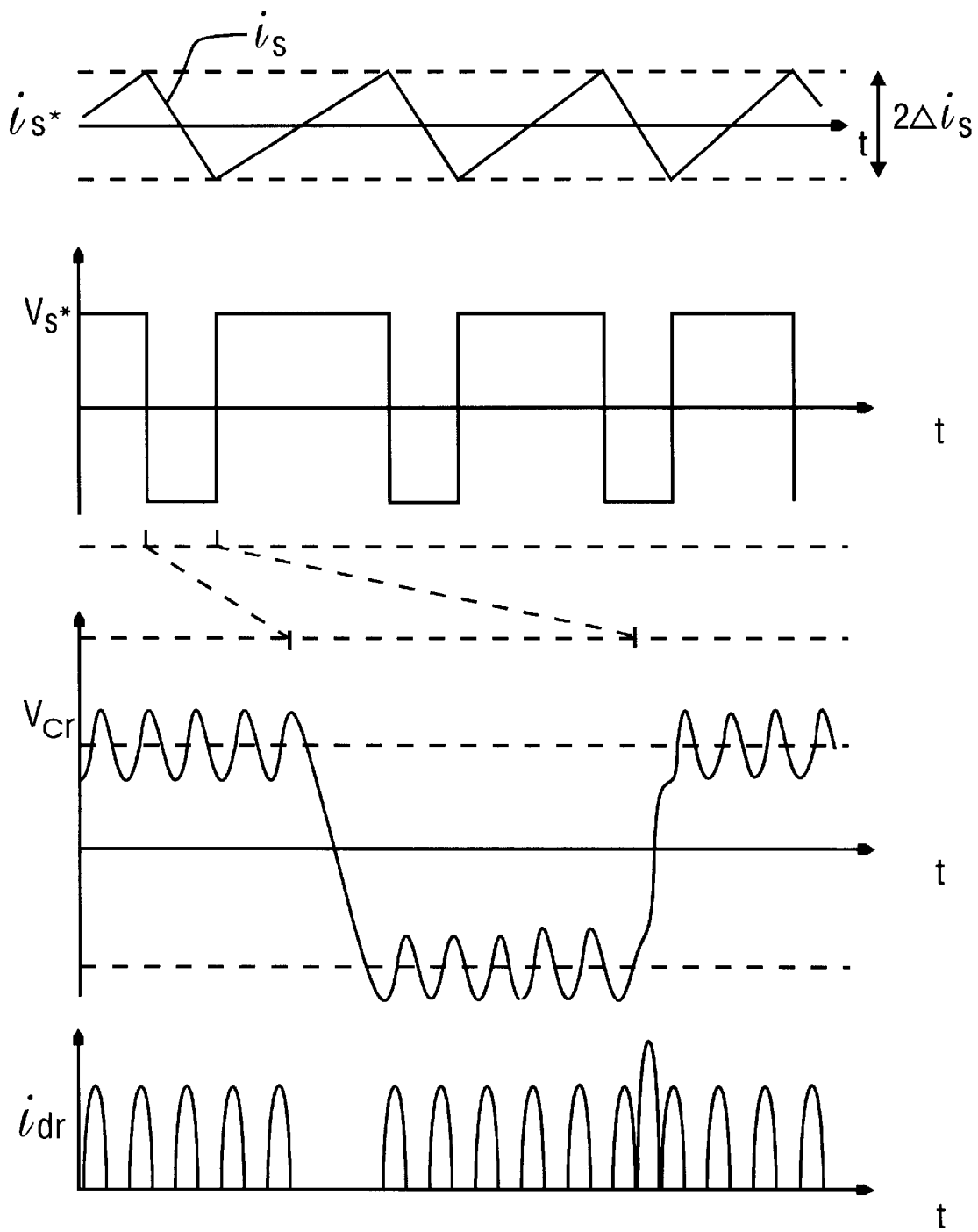

FIG. 6 is a graphical illustration of the input commands $i_S^*$, the actual current is, and the command voltage $V_S^*$ for driving the current controller of FIG. 5 in order to achieve the phase current transition as in FIG. 4(f).

Figure 7:
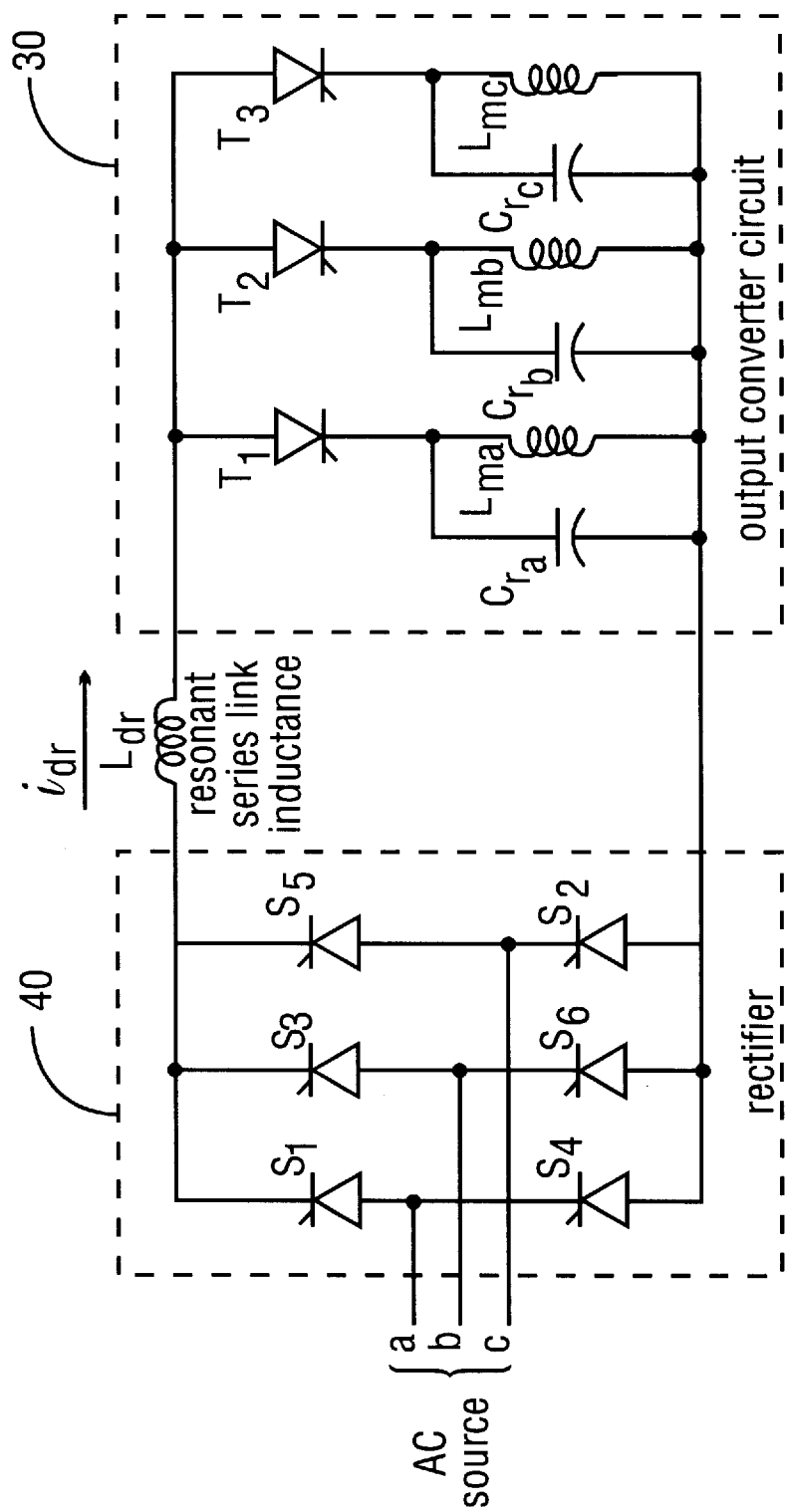

FIG. 7 is a schematic diagram of another modification of a series-resonant zero-current SRM power converter circuit according to multi-phase (3-phase) AC-to-AC embodiment.

Figure 8:
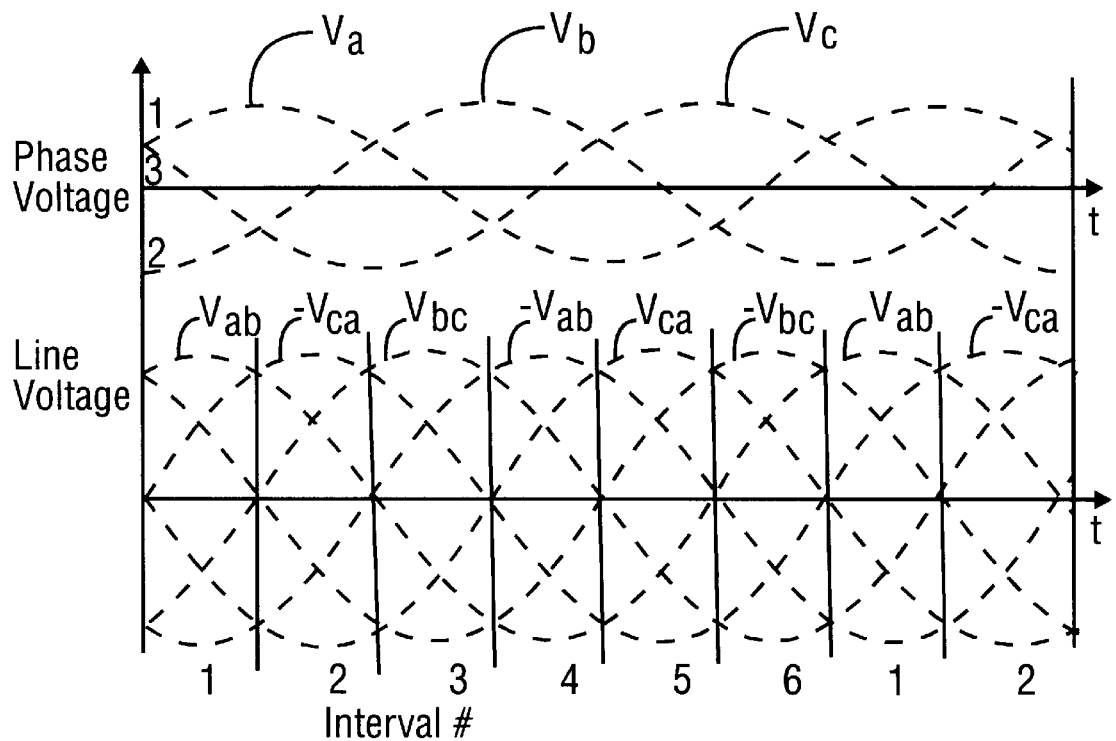

FIG. 8 is a graphical illustration of the three-phase voltage and command voltages for driving the power converter of FIG. 7.

Figure 9:
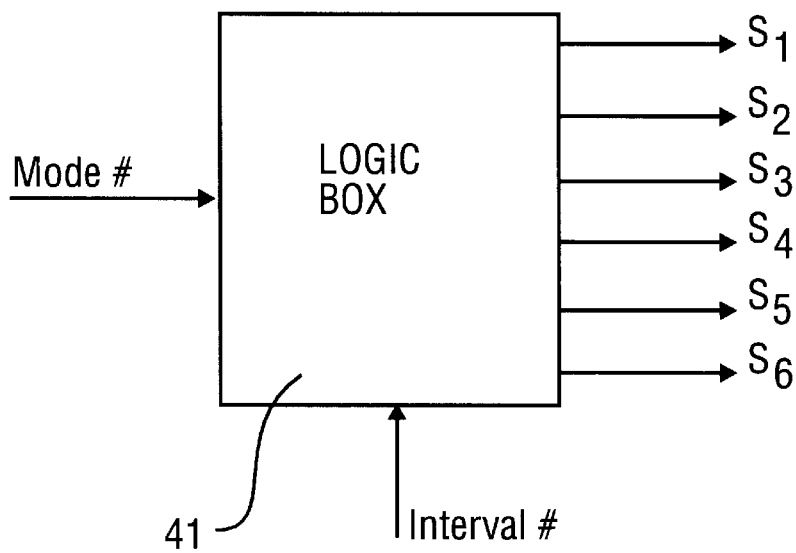

FIG. 9 is a simplified block diagram of a current controller of the present invention which is suitable for switching the power converter of FIG. 7 according to the switching strategy shown in Table I.

DESCRIPTION

The series-resonant zero-current SRM power converter circuit of the present invention will be described with regard to a single-phase DC / three-phase AC current source embodiment as shown in FIG. 1. However, it will be appreciated by those skilled in the art that the invention may be practiced with a conventional switched AC/DC input rectifier circuit on the front end for converting a multi-phase AC input to unregulated DC (as shown in FIG. 7).

The embodiment of FIG. 1 is designed for delivering current to each of three phases A–C in a three-phase switched reluctance motor (SRM). It should be readily apparent that the invention can be modified to drive an SRM having any number of phases.

The device of FIG. 1 includes a conventional switched DC/DC input circuit 10 coupled to an output converter circuit 30 via a resonant link inductance $L_{dr}$.

The input circuit 10 comprises a pair of switch devices $S_1$ and $S_2$ connected to the respective (+) and (−) terminals of an input voltage $V_{dc}$ source. Specifically, the cathode of switch device $S_1$ is connected to the (+) terminal of the input voltage $V_{dc}$ source, while the anode of switch device $S_2$ is connected to the (−) terminal. Switch devices $S_1$ and $S_2$ are preferably uni-polar naturally-commutated devices such as thyristors or the like. However, hard-switched devices such as transistors or GTO's may be employed instead. Input inverter circuit 10 also includes a pair of diodes $D_1$ and $D_2$ cross-coupled between switch devices $S_1$ and $S_2$. Specifically, the anode of diode $D_2$ is connected to the anode of the switch device $S_1$, the anode of diode $D_1$ is connected to the cathode of switch device $S_1$ the cathode of diode $D_1$ is connected to the cathode of switch device $S_2$, and finally, the cathode of diode $D_2$ is connected to the anode of switch device $S_2$.

The input circuit 10 is coupled to the output converter circuit 30 through resonant inductance $L_{dr}$.

Output converter circuit 30 comprises a plurality of parallely-connected switch legs each for driving a corresponding phase of the SRM. In this example, there are three SRM phases. Consequently, there are three switch legs each including one of main switch devices $T_1$, $T_2$, and $T_3$ connected in series with a corresponding resonant capacitance $C_{r1}$, $C_{r2}$, and $C_{r3}$.

The phase windings $L_{ma}$, $L_{mb}$, and $L_{mc}$ of the three-phase SRM are each connected in parallel with a corresponding one of the resonant capacitances $C_{r1}$, $C_{r2}$, and $C_{r3}$.

The inductance $L_{dr}$ and capacitances $C_{r1}$, $C_{r2}$, and $C_{r3}$ make up the series-resonant circuit.

In operation of the embodiment of FIG. 1, the input circuit 10 may be switched to supply a selectable polarity of unregulated DC power. The unregulated DC power is applied to the resonant link which includes inductance $L_{dr}$ and capacitances $C_{r1}$, $C_{r2}$, and $C_{r3}$. The resonant DC link in turn generates a resonating DC link current $i_{dr}$ which flows to the output converter circuit 30. Output converter circuit 30 is switched according to a predetermined switching sequence to distribute the resonating link current $i_{dr}$ to each of the three phase windings $L_{ma}$–$L_{mc}$ of the three-phase SRM. Since the link current $i_{dr}$ resonates from zero to full current during every resonant cycle, zero-current intervals are established. Switching of the main switch devices $T_1$–$T_3$ may be accomplished during the zero current intervals. Consequently, the main switches $T_1$, $T_2$, and $T_3$ may be naturally commutated to distribute the link current $i_{dr}$ to the respective SRM phase windings $L_{ma}$, $L_{mb}$, and $L_{mc}$.

The above-described power converter is capable of a switching sequence which entails the following four modes of operation (best shown in FIG. 2) necessary for driving a conventional SRM:

1. Powering Mode (Mode I);
2. Discharging Mode (Mode II);
3. Recovery Mode (Mode III); and
4. Reversing Mode (Mode IV).

POWERING MODE (MODE I)

In powering mode (a.k.a. motoring mode), a positive phase current is delivered to the incoming phase winding of the SRM to engender continuous forward rotation. Powering mode is initiated by turning "on" the main switch devices $S_1$ and $S_2$. The main switches $T_1$, $T_2$, and $T_3$ are sequentially gated to apply drive current to each successive incoming motor winding $L_{ma}$, $L_{mb}$, and $L_{mc}$.

FIG. 2(a) shows the simplified equivalent circuit for the circuit of FIG. 1 when operated in powering mode (mode I). The operative current paths are shown in bold. With both main switch devices $S_1$ and $S_2$ gated "on", the main switch T for the next incoming phase winding $L_m$ is gated "on" to apply drive current to the phase winding. The corresponding capacitor $C_r$ charges until it attains a voltage $V_{co}+$, as shown in FIG. 3 (voltage $V_{co}+$ being somewhat less than $V_{dc}$). Due to the potential difference $V_{dc}-V_{co}+$, a resonant link current $i_{dr}$ will flow through resonant inductance $L_{dr}$ and through the active SRM phase winding $L_m$ via the gated main switch device T. The link current $i_{dr}$ will peak as capacitor $C_r$ charges, and will resonate to zero as the capacitor $C_r$ voltage reaches voltage $V_{co}+$.

DISCHARGING MODE (MODE II)

After a finite period of time $T_1$, the capacitor $C_r$ voltage will reach voltage $V_{co}+$ prompting the link current to resonate to zero, and the powering mode I will end. During the ensuing zero current interval, there is no current flow through any of the main switch devices $T_1$–$T_3$, and the switch devices may be naturally commutated "off". This marks the discharging mode (mode II), and the equivalent circuit is illustrated in FIG. 2(b) with operative current paths shown in bold. The charged capacitor $C_r$ is almost linearly discharged because the inductance of the connected SRM phase winding $L_m$ is much larger than that of the resonant inductance $L_{dr}$. Consequently, the phase current which is output to the respective SRM phase winding $L_m$ is substantially constant during mode II. Mode II continues until the voltage across the charged capacitor $C_r$ falls to the initial voltage $V_{co}-$.

RECOVERY MODE (MODE III)

Recovery mode is initiated by turning "on" the main switch device T while the switch devices $S_1$ and $S_2$ remain in an "off" state. In this mode III, the simplified equivalent circuit with bold current paths is shown in FIG. 2(c). This reverses the polarity of the unregulated DC power applied to the resonant link and forces the resonant link current $i_{dr}$ to flow through diodes $D_1$ and $D_2$. Assuming that the active capacitor $C_r$ is initially charged to $V_{co}-$, where $V_{co}-$ is necessarily less than $-V_{dc}$, then a selected one of the main switches T may be gated to apply a negative drive current to an incoming motor winding $L_m$. The corresponding capacitor $C_r$ charges to a voltage $-V_{co}-$, the voltage $-V_{co}-$ being somewhat greater than $-V_{dc}$. Due to the potential difference $-V_{co}-V_{dc}-$, the resonant link current $i_{dr}$ will flow through inductance $L_{dr}$ via the gated switch device T. The link current $i_{dr}$ will again resonate to a peak value and back to zero.

REVERSING MODE (MODE IV)

The above-described recovery mode (mode II) may be switched directly back to powering mode (mode I), in which case the link current $i_{dr}$ and the voltage across the active capacitor $C_r$ can be greatly increased. Alternatively, a reversing mode (mode IV) may be implemented in order to reduce the voltage across the active capacitor $C_r$ as well as the link current $i_{dr}$.

The reversing mode may be initiated by reversing the voltage $V_{cr}$ across the active capacitor $C_r$ at the conclusion of either the powering mode (mode I) or recovery mode (mode II). This is accomplished by turning "on" switch devices $S_1$ and $T_1$ while switch device $S_2$ is maintained in the "off" state.

FIG. 3 shows the voltage $V_{cr}$ across the active capacitor $C_r$, as well as the link current $i_{dr}$, as the series-resonant power converter of the present invention is operated across all four of the above-described modes I–IV.

The present invention also provides a method and apparatus for controlling the switching sequence of the above-described resonant DC link to drive a SRM.

For a typical SRM, the phase currents $i_a$, $i_b$, and $i_c$ which are delivered to each phase by the power converter must correspond to the inductance profile of the SRM. An exemplary inductance profile for a typical three-phase SRM is shown in FIG. 4(a). An ideal current drive profile is shown in FIG. 4(b). The ideal phase currents $i_a^*$, $i_b^*$ and $i_c^*$ are delivered to the respective phase windings of the SRM while the corresponding phase inductances $L_a$, $L_b$, and $L_c$ are increasing. Conversely, the phase currents $i_a$, $i_b$, and $i_c$ should be instantaneously removed when the corresponding phase inductances $L_a$, $L_b$, and $L_c$ begin to decrease. Considering an exemplary transition from outgoing phase A to incoming phase B, the voltage $V_{cr1}$ across capacitance $C_{r1}$ is shown in FIG. 4(c) and the voltage $V_{cr2}$ across capacitance $C_{r2}$ is shown in FIG. 4(d). The resonating link current $i_{dr}$ is shown in FIG. 4(e). Under actual conditions, the commutation time between the incoming and outgoing phases cannot be instantaneous because the inductance of the outgoing phase is a maximum when that phase should be switched "off". Hence, the actual phase currents $i_a$, $i_b$, and $i_c$ gradually decrease to zero after switching occurs. As shown in FIG. 4(f), the actual phase currents $i_a$, $i_b$, and $i_c$ must be delayed and overlapped by a suitable method and apparatus for current control such as the following.

FIG. 5 is a block diagram of a current controller according to the present invention which is suitable for generating the appropriate gating signals for operation of the power converter of FIG. 1. In the present invention, a voltage regulation process is required for regulation because the converter is operated under a soft switching condition instead of the hard switching condition. The process in which the output voltage is regulated according to the command value, and the process in which the output current is regulated, can be understood from FIG. 6. FIG. 6 shows the input commands $i_S^*$ the actual current is, and the command voltage $V_S^*$ which drive the current controller of FIG. 5. The current $i_S$ is one of the motor currents, while $i_S^*$ is generated by a computer which receives feedback signals such as rotor angular position and torque demand to form a current demand pulse the amplitude of which is set by the torque demand and the width of which is fixed by the rotor speed. The quantities h(k) and h(k-1) are logic signals denoting the polarity of the current error, $i^*_S - i_S$, during the present time interval h(k) and the previous time interval h(k-1).

As seen in FIG. 6, the power converter is operated in powering mode I for incoming phase B during the overlapping commutation interval while it is operated in the discharging mode II for outgoing phase A. In the next switching interval, the power converter is operated in the recovery mode III for the inactive A phase, in the discharging mode IV for the active B phase, and in powering mode I for incoming phase C. The next successive interval continues with the power converter being operated in the discharging mode IV for the active outgoing C phase, in the powering mode I for incoming phase A, and in recovery mode III for the now inactive B phase. The sequence continues for as long as desired.

As a result of the above-described current control, the phase currents are well regulated even while in the overlapping interval.

Alternatively to the single phase DC-to-DC embodiment of the present invention (best shown in FIG. 1), the series resonant DC link power converter can be implemented as AC-to-DC modification thereof. As best shown in FIG. 7, the series resonant DC link power converter of the present invention includes a AC/DC input rectifier circuit 40 coupled to the output converter circuit 30 via the resonant link inductance $L_{dr}$. The input rectifier circuit 40 comprises three pairs of gated switch devices $S_1$–$S_6$, arranged in three parallely connected switch legs, such that each switch leg has an upper switch device connected in series to a lower switch device, as follows: $S_1$–$S_4$, $S_3$–$S_6$, and $S_5$–$S_2$. The connection between each upper switch device ($S_1$, $S_3$, $S_5$) and a respective lower switch device ($S_4$, $S_6$, $S_2$) is connected to a three-phase AC power supply. The switch devices $S_1$–$S_6$ are preferably thyristors.

In the converter shown in FIG. 7, current of the link $L_{dr}$ is brought to zero by resonance between the inductance $L_{dr}$ and capacitances $C_{ra}$, $C_{rb}$ and $C_{rc}$ in much the same manner as in the converter of FIG. 1. Again, switching of the line side thyristors ($S_1 \ldots S_4$) and load side thyristors ($T_1$, $T_2$, $T_3$) can be accomplished at the current zero intervals of id since all of the conducting thyristors will then recover their voltage blocking ability.

Figure 2:
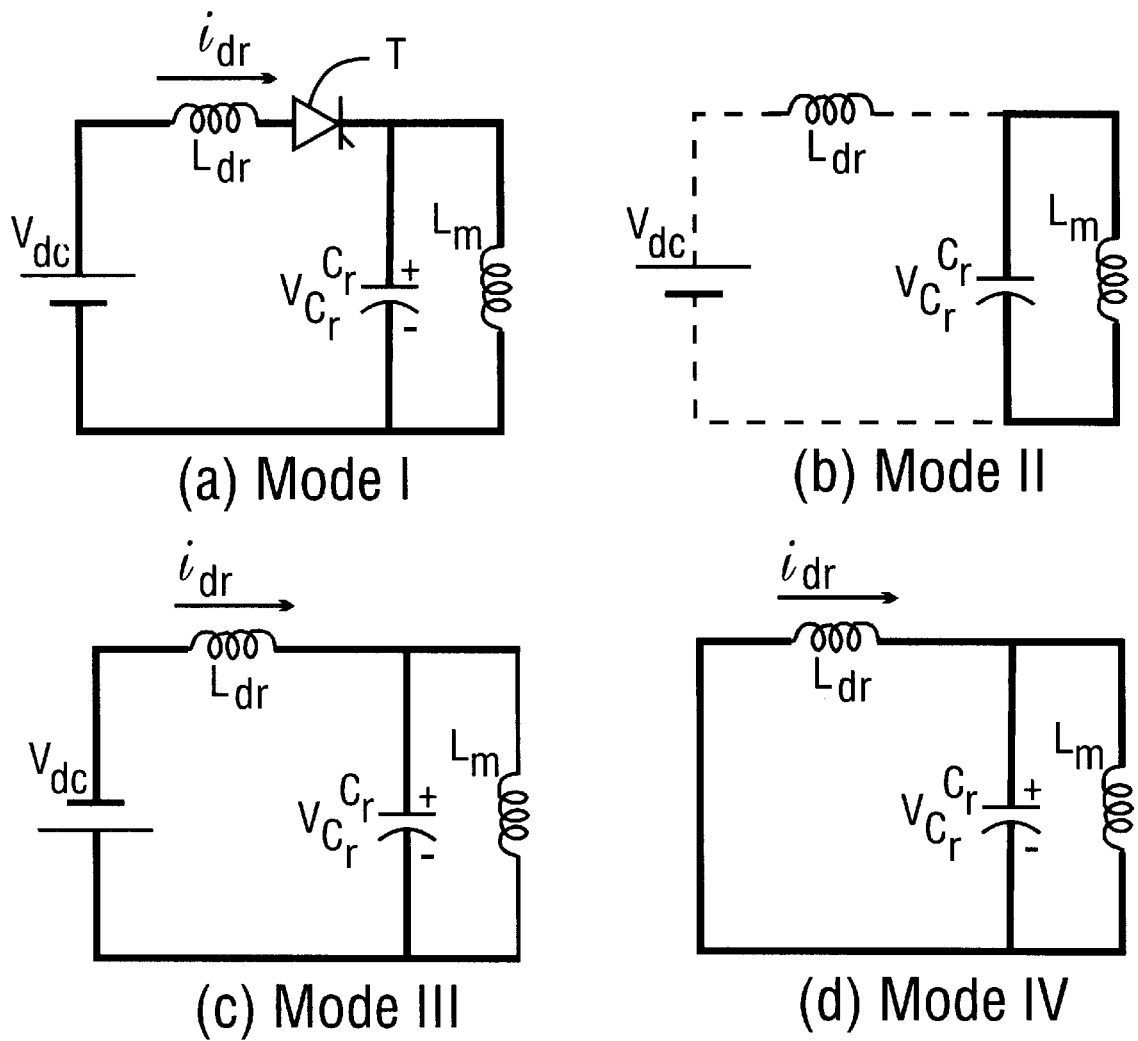
FIGS. 2(a–d) show the simplified equivalent circuits for the circuit of FIG. 1 when operated in powering mode (mode I), discharging mode (mode II), recovery mode (mode III), and reversing mode (mode IV).
Figure 3:
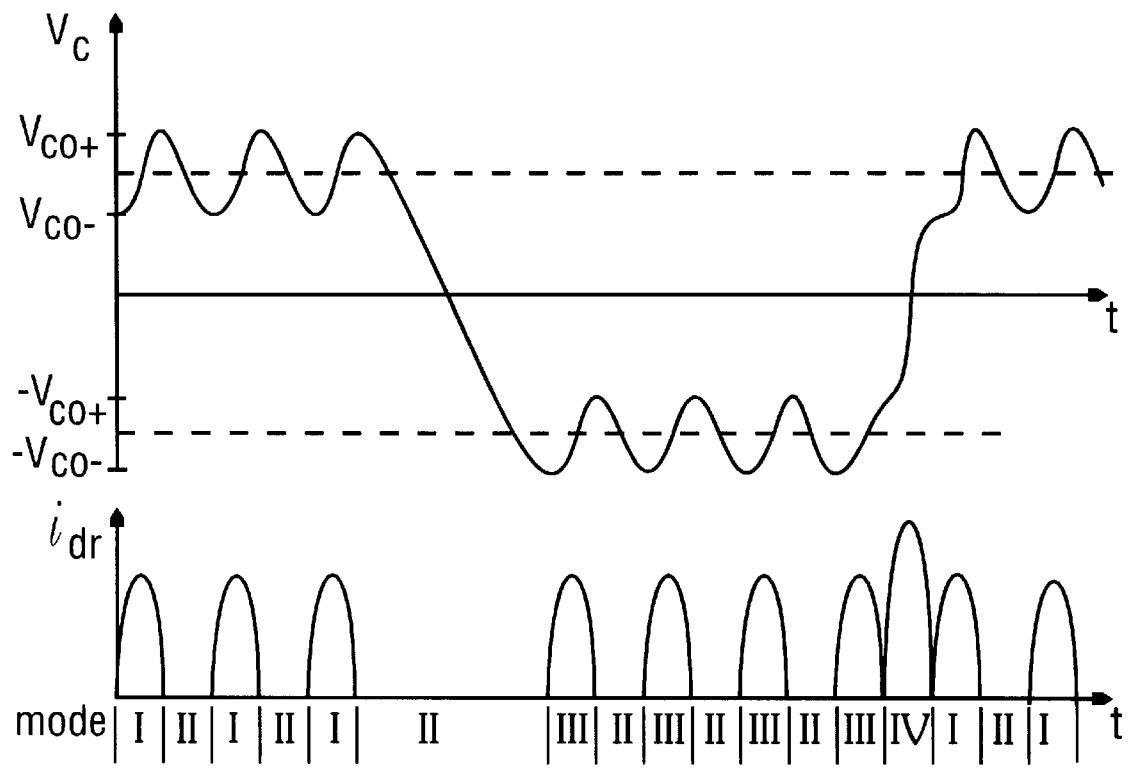
FIG. 3 is a graphical illustration showing the voltage $V_{cr}$ across the active capacitor $C_r$ (top graph) and the link current $i_{dr}$ (bottom graph) for the series-resonant power converter of the present invention while operated across all four of the above-described modes I–IV.

Referring to FIG. 2, it is noted that Mode I, III and IV require positive, negative and zero voltage to be applied to the circuit respectively. Mode II (discharging mode), as discussed above, requires zero current which can be obtained by not triggering any of the switch devices. In the case of a three phase supply, as best shown in FIG. 7, the proper phases must be related to produce a positive, negative or zero voltage at any instant in a cycle of the input.

Referring to FIG. 8, it can be noted that six intervals of voltage can be defined wherein, during the interval 1, $V_{ab}$ is the most positive voltage and $-V_{ab}$ is the most negative. During the interval 2, $-V_{ca}$ is the most positive and $+V_{ca}$ the most negative and so forth. Hence, when positive voltage is desired on the DC link during the interval 1, thyristors $S_1$ and $S_2$ are triggered, if negative voltage is required, $S_4$ and $S_5$ are triggered, if zero voltage is required $S_1$ and $S_4$ are triggered. Similarly, switching strategies can be readily deduced for the remaining five intervals. The switching strategy of FIG. 5 can be modified for three phase sine wave supply as shown in Table I and FIG. 9. Here, the switching logic signals which specify the four circuit modes are supplied to a logic box 41 which also reserves a logic input specifying which of the six intervals exists at any moment. The output of the logic box 41 is determined by Table I. The logic outputs from the logic box 41 are fed to the gates of the six thyristors $S_1$–$S_6$ via amplifiers. Logic "1" corresponds to a gate signal applied, while logic "0" denotes an absence of a gate signal.

TABLE I

| Interval | Mode | $V_{dc}*$ | $i_{dr}$ | $S_1$ | $S_2$ | $S_3$ | $S_4$ | $S_5$ | $S_6$ |
|---|---|---|---|---|---|---|---|---|---|
| #1 | I | $+V_{dc}*$ | $+i_{dr}$ | 1 | 0 | 0 | 0 | 0 | 1 |
| $V_{ab}$ max positive | II | $\pm V_{dc}*$ | 0 | 0 | 0 | 0 | 0 | 0 | 0 |
| | III | $-V_{dc}*$ | 0 | 0 | 0 | 1 | 1 | 0 | 0 |
| | IV | $\mp V_{dc}*$ | $+i_{dr}$ | 1 | 0 | 0 | 1 | 0 | 0 |
| #2 | I | $+V_{dc}*$ | $+i_{dr}$ | 1 | 1 | 0 | 0 | 0 | 0 |
| $V_{ca}$ max negative | II | $\pm V_{dc}*$ | 0 | 0 | 0 | 0 | 0 | 0 | 0 |
| | III | $-V_{dc}*$ | 0 | 0 | 0 | 0 | 1 | 1 | 0 |
| | IV | $\mp V_{dc}*$ | $+i_{dr}$ | 0 | 0 | 1 | 0 | 0 | 1 |
| #3 | I | $+V_{dc}*$ | $+i_{dr}$ | 0 | 1 | 1 | 0 | 0 | 0 |
| $V_{bc}$ max positive | II | $\pm V_{dc}*$ | 0 | 0 | 0 | 0 | 0 | 0 | 0 |
| | III | $-V_{dc}*$ | 0 | 0 | 0 | 0 | 0 | 1 | 1 |
| | IV | $\mp V_{dc}*$ | $+i_{dr}$ | 0 | 1 | 0 | 0 | 1 | 0 |
| #4 | I | $+V_{dc}*$ | $+i_{dr}$ | 0 | 0 | 1 | 1 | 0 | 0 |
| $V_{ab}$ max negative | II | $\pm V_{dc}*$ | 0 | 0 | 0 | 0 | 0 | 0 | 0 |
| | III | $-V_{dc}*$ | 0 | 1 | 0 | 0 | 0 | 0 | 1 |
| | IV | $\mp V_{dc}*$ | $+i_{dr}$ | 1 | 0 | 0 | 1 | 0 | 0 |
| #5 | I | $+V_{dc}*$ | $+i_{dr}$ | 0 | 0 | 0 | 1 | 1 | 0 |
| $N_{ca}$ max positive | II | $\pm V_{dc}*$ | 0 | 0 | 0 | 0 | 0 | 0 | 0 |
| | III | $-V_{dc}*$ | 0 | 1 | 1 | 0 | 0 | 0 | 0 |
| | IV | $\mp V_{dc}*$ | $+i_{dr}$ | 0 | 0 | 1 | 0 | 0 | 1 |
| #6 | I | $+V_{dc}*$ | $+i_{dr}$ | 0 | 0 | 0 | 0 | 1 | 1 |
| $V_{bc}$ max negative | II | $\pm V_{dc}*$ | 0 | 0 | 0 | 0 | 0 | 0 | 0 |
| | III | $-V_{dc}*$ | 0 | 0 | 1 | 1 | 0 | 0 | 0 |
| | IV | $\mp V_{dc}*$ | $+i_{dr}$ | 0 | 1 | 0 | 0 | 1 | 0 |

Obviously, many modifications may be made without departing from the basic spirit of the present invention. Accordingly, it will be appreciated by those skilled in the art that within the scope of the appended claims, the invention may be practiced other than has been specifically described herein.

We claim:

1. A series resonant DC link power converter for powering a switched reluctance motor (SRM) comprising:
   a switched input circuit connectable to an input power source for providing a DC supply current and an operative output voltage of selectable polarity;
   a resonating inductance connected to said switched input circuit for generating a resonating DC link current from said DC supply current and said operative output voltage; and
   a switched output converter circuit connected to said resonating inductance for synthesizing a multi-phase alternating polarity output voltage signal from said resonating DC link current, said switched output converter circuit including a plurality of parallely-connected switch legs each corresponding to a phase of said switched reluctance motor, and each of said switch legs further comprising a resonating capacitance connected in series with a switch device and in parallel with a phase winding of said switched reluctance motor.

2. The switched power converter according to claim 1, wherein said input power source is a DC source and wherein said switched input circuit further comprises a first diode with an anode connected to the cathode of a first switch device, a second diode having an anode connected to an anode of said first switch device, and a second switch device having a cathode connected to the cathode of said first diode and an anode connected to the cathode of said second diode.

3. The switched power converter according to claim 1, wherein the input power source is an N-phase power supply and wherein said switched input circuit further comprises an AC-to-DC current converter having 2N gated switch devices arranged in N parallely-connected switch legs, each switch leg having an upper switch device connected in series to a lower switch device, the connection between each switch device being connectable to a phase of the N-phase power supply.

4. The switched power converter according to claim 3, wherein said AC-to-DC current converter has six gated switch devices arranged in three parallely-connected switch legs for connection to a three-phase power supply.

5. The switched power converter according to claim 1, wherein said switch devices further comprise thyristors.

6. The switched power converter of claim 2, further comprising a current controller for switching the first and second switch devices of said switched circuit and the switch devices of the output converter circuit in a certain sequence.

7. The switched power converter of claim 3, further comprising a current controller for switching the switch devices of the AC-to-DC current converter and the switch devices of the output converter circuit in a certain sequence.

8. A power converter for powering a switched reluctance motor from a DC input power supply, comprising:
   a DC-to-DC voltage input converter circuit connected to the DC input power supply and providing a DC supply voltage of selectable polarity;
   a resonating inductance connected in series to said DC-to-DC input voltage converter, circuit and generating a resonating DC link current from said DC supply voltage; and
   an output converter circuit connected in series to said resonating inductance for synthesizing a multi-phase output signal from said resonating DC link current;
   wherein said DC-to-DC input voltage converter circuit includes first and second diodes and first And second switch devices, wherein an anode of the first diode is connected to a cathode of the first switch device, an anode of the second diode is connected to an anode of said first switch device, a cathode of the second switch device is connected to a cathode of said first diode and an anode of the second switch device is connected to the cathode of said second diode,
   wherein, said output converter circuit includes a plurality of parallely-connected switch legs each corresponding to a respective phase of said switched reluctance motor, and each of said switch legs further comprising a resonating capacitance connected in series with a switch device and in parallel with a phase winding of said switched reluctance motor, and wherein a controlling means switches said first and second switch devices of the DC-to-DC input voltage converter circuit and the switch devices of the output converter circuit in a predetermined sequence.

9. An alternating polarity to alternating polarity power converter for powering a switched reluctance motor from a N-phase AC input power supply, comprising:

an AC-to-DC input rectifier circuit connected to the N-Phase AC input power supply and providing a DC supply voltage of selectable polarity;

a resonating inductance connected in series to said AC-to-DC input rectifier circuit and generating a resonating DC link current from said DC supply voltage; and an output converter circuit connected in series to said resonating inductance for synthesizing a multi-phase alternating polarity output signal from said resonating DC link current;

wherein said AC-to-DC input rectifier circuit includes 2N gated switch devices arranged in N parallely-connected switch legs, each switch leg having an upper switch device connected in series to a lower switch device, the connection between each switch device being connectable to a respective phase of an N-phase input power supply, wherein said output converter circuit includes a plurality of parallely-connected switch legs each corresponding to a respective phase of said switched reluctance motor, and each of said switch legs further comprising a resonating capacitance connected in series with a switch device and in parallel with a phase winding of said switched reluctance motor, and wherein a controlling means switches said 2N switch devices of the AC-to-DC input rectifier circuit and said switch devices of the output converter circuit in a predetermined sequence.

10. A method for powering a switched reluctance motor (SRM) by a series resonant converter, comprising the steps of:

providing a switched input circuit connected to a DC input power supply and generating a DC supply voltage of a selectable polarity, wherein said switched input circuit further comprises a first diode with an anode connected to the cathode of a first switch device, a second diode having an anode connected to an anode of said first switch device, and a second switch device having a cathode connected to the cathode of said first diode and an anode connected to the cathode of said second diode, providing a resonating inductance connected to said switched input circuit for generating a resonating DC link current from said DC supply voltage;

providing a switched output converter circuit connected to said resonating inductance for synthesizing a multi-phase alternating polarity output voltage signal from said resonating DC link current, said switched output converter circuit including a plurality of parallely-connected switch legs each corresponding to a phase of said switched reluctance motor, and each of said switch legs further comprising a resonating capacitance connected in series with a main switch device and in parallel with a phase winding of said switched reluctance motor; and providing a controlling means for switching said first and second switch devices of said switched input circuit and each said main switching device of the output converter circuit corresponding to a respective phase winding of the SRM in the following predetermined sequence:

turning "on" the first and the second switch devices of the switched input circuit and the main switch of the output converter circuit, thereby constituting a powering mode;

terminating the powering mode after a certain period of time, thereby constituting a discharging mode;

turning "on" the main switch of the output converter circuit while maintaining the first and the second switch devices of the switched input circuit in their turn-off state, thereby constituting a recovery mode, and turning "on" the first switch device of the switched input circuit while maintaining the second switch device of the switched input circuit in the off-state and the main switch device of the output converter circuit in the on-state, thereby constituting a reversing mode.

* * * * *